(12) United States Patent
Shila (10) Patent No.: US 11,941,118 B2
(45) Date of Patent: Mar. 26, 2024

(54) SYSTEM AND METHOD TO BUILD ROBUST CLASSIFIERS AGAINST EVASION ATTACKS

(71) Applicant: CARRIER CORPORATION, Palm Beach Gardens, FL (US)

(72) Inventor: Devu Manikantan Shila, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 397 days.

(21) Appl. No.: 16/972,243

(22) PCT Filed: Oct. 30, 2019

(86) PCT No.: PCT/US2019/058697
§ 371 (c)(1),
(2) Date: Dec. 4, 2020

(87) PCT Pub. No.: WO2020/096826
PCT Pub. Date: May 14, 2020

(65) Prior Publication Data
US 2021/0256121 A1 Aug. 19, 2021

(30) Foreign Application Priority Data
Nov. 6, 2018 (IN) .............................. 201811041945

(51) Int. Cl.
*G06F 21/56* (2013.01)
*G06F 18/2113* (2023.01)
(Continued)

(52) U.S. Cl.
CPC ........ *G06F 21/562* (2013.01); *G06F 18/2113* (2023.01); *G06F 18/22* (2023.01); *G06F 21/554* (2013.01); *G06N 20/00* (2019.01)

(58) Field of Classification Search
CPC .... G06F 21/562; G06F 18/2113; G06F 18/22; G06F 21/554; G06N 20/00
See application file for complete search history.

(56) References Cited

U.S. PATENT DOCUMENTS 7,127,106 B1 * 10/2006 Neil ..................... G06V 10/443
382/209
8,959,633 B1 * 2/2015 Dokey ................ H04L 63/1408
709/224
(Continued)

FOREIGN PATENT DOCUMENTS

CN 104598825 A 5/2015

OTHER PUBLICATIONS

Anonymous, "Attacking Machine Learning with Adversarial Examples", Publication Date: Feb. 24, 2017, Retrieved from https://blog.openai.com/adversarialexampleresearch/, 9 pages.
(Continued)

*Primary Examiner* — Aravind K Moorthy
(74) *Attorney, Agent, or Firm* — CANTOR COLBURN LLP (57) ABSTRACT

A method for building a robust classifier against evasion attacks includes receiving an application, identifying one or more features of the application, and determining a first confidence score for a first version of the application including a first set of features and determining a second confidence score for a second version of the application including a second set of features, the first set of features is different than the second set of features. The method also includes determining a difference between the first confidence score and the second confidence score, and comparing the difference with a convergence threshold. The method includes, based on the comparison, determining whether the first confidence score exceeds a confidence score threshold, and (Continued)

generating a report based on determining the first confidence score exceeds the confidence score threshold.

13 Claims, 4 Drawing Sheets

(51) Int. Cl.
  *G06F 18/22* (2023.01)
  *G06F 21/55* (2013.01)
  *G06N 20/00* (2019.01)

(56) References Cited

U.S. PATENT DOCUMENTS

| | | | |
|---|---|---|---|
| 9,324,070 B1* | 4/2016 | Bekmann | G06Q 20/401 |
| 9,894,045 B1* | 2/2018 | Mao | G06F 21/554 |
| 10,015,185 B1* | 7/2018 | Kolman | H04L 63/1425 |
| 10,027,692 B2* | 7/2018 | Hay | G06F 21/566 |
| 10,122,742 B1* | 11/2018 | Oprea | G06F 16/285 |
| 10,192,052 B1* | 1/2019 | Singh | G06F 21/562 |
| 10,270,769 B2* | 4/2019 | Jevans | G06F 21/51 |
| 10,824,541 B1* | 11/2020 | Kongara | G06F 8/71 |
| 10,880,322 B1* | 12/2020 | Jakobsson | H04L 51/08 |
| 11,087,334 B1* | 8/2021 | McEachern | H04L 51/046 |
| 11,605,093 B1* | 3/2023 | Cervantez | G06Q 30/0185 |
| 11,704,589 B1* | 7/2023 | Sohoney | G06N 20/00 706/12 |
| 2005/0097339 A1* | 5/2005 | Wiley | H04L 63/1416 713/188 |
| 2006/0168574 A1* | 7/2006 | Giannini | H04L 67/10 717/168 |
| 2009/0290764 A1* | 11/2009 | Fiebrink | G06F 16/61 382/124 |
| 2010/0131452 A1* | 5/2010 | Fitzmaurice | G06F 9/453 715/708 |
| 2011/0028138 A1* | 2/2011 | Davies-Moore | G06F 3/04817 455/418 |
| 2013/0111422 A1* | 5/2013 | Reed | G06F 30/398 716/102 |
| 2014/0258784 A1* | 9/2014 | Tepus | G06F 11/3688 714/38.1 |
| 2015/0127406 A1* | 5/2015 | Hoen, IV | H04L 63/104 705/7.22 |
| 2015/0193618 A1* | 7/2015 | Takano | G06F 8/65 726/23 |
| 2015/0213376 A1* | 7/2015 | Ideses | G06N 20/00 706/12 |
| 2015/0365437 A1* | 12/2015 | Bell, Jr. | G06F 21/54 726/1 |
| 2015/0370446 A1* | 12/2015 | Zhang | G06F 16/24578 715/716 |
| 2016/0004627 A1* | 1/2016 | Farchi | G06N 7/01 717/127 |
| 2016/0065608 A1* | 3/2016 | Futty | H04L 63/1433 726/25 |
| 2016/0078362 A1* | 3/2016 | Christodorescu | G06N 20/10 706/12 |
| 2016/0335286 A1* | 11/2016 | Desineni | H04L 67/02 |
| 2017/0046510 A1* | 2/2017 | Chen | G06F 21/552 |
| 2017/0154182 A1 | 6/2017 | Ferrara et al. | |
| 2017/0230417 A1* | 8/2017 | Amar | H04L 63/08 |
| 2017/0308807 A1* | 10/2017 | Hauth | G06F 16/24578 |
| 2017/0318038 A1* | 11/2017 | Shehory | G06F 21/56 |
| 2017/0357814 A1* | 12/2017 | Mahaffey | H04W 12/12 |
| 2017/0372066 A1* | 12/2017 | Deng | G06F 21/562 |
| 2018/0004507 A1* | 1/2018 | Aijaz | G06F 9/44505 |
| 2018/0107924 A1* | 4/2018 | Benson | G06N 20/10 |
| 2018/0139227 A1* | 5/2018 | Martin | H04L 63/1433 |
| 2018/0218145 A1* | 8/2018 | Hussain | H04L 63/10 |
| 2018/0247335 A1* | 8/2018 | Tang | G06Q 30/0254 |
| 2018/0253551 A1* | 9/2018 | Chalmandrier-Perna | G06F 21/554 |
| 2018/0358001 A1* | 12/2018 | Amid | G06F 16/3329 |
| 2019/0005549 A1* | 1/2019 | Goldshtein | G06Q 30/0277 |
| 2019/0042953 A1* | 2/2019 | Duesterwald | G06F 18/214 |
| 2019/0065259 A1* | 2/2019 | Venkata Naga Ravi | G06F 3/01 |
| 2019/0156191 A1* | 5/2019 | Cordes | G08B 21/182 |
| 2019/0163544 A1* | 5/2019 | Ekambaram | H04L 67/535 |
| 2019/0188614 A1* | 6/2019 | Ferranti | G06Q 10/0635 |
| 2019/0310929 A1* | 10/2019 | Wright | G06F 11/3608 |
| 2019/0340462 A1* | 11/2019 | Pao | G06V 10/82 |
| 2019/0370345 A1* | 12/2019 | Katukuri | G06F 16/287 |
| 2020/0019393 A1* | 1/2020 | Vichare | G06N 20/00 |
| 2020/0026865 A1* | 1/2020 | Hulick, Jr. | G06F 11/3065 |
| 2020/0051695 A1* | 2/2020 | Sevenster | G16H 10/60 |
| 2020/0053108 A1* | 2/2020 | Cili | G06F 18/2113 |
| 2020/0057850 A1* | 2/2020 | Kraus | G06F 21/552 |
| 2020/0110870 A1* | 4/2020 | Girdhar | G06F 21/316 |
| 2020/0110905 A1* | 4/2020 | O'Cleirigh | G06F 21/51 |
| 2020/0134009 A1* | 4/2020 | Zhao | G06N 3/044 |

OTHER PUBLICATIONS

Bhagoji et al., "Enhancing robustness of Machine Learning Systems via Data Transformations", Princeton University, Publication Date: Aug. 15, 2017, Retrieved from https://www.princeton.edu/~dcullina/docs/enhancing-robustness.pdf, 15 pages.

Demontis et al., "Yes, Machine Learning Can be More Secure! A Case Study on Android Malware Detection" IEEE, Apr. 2017, 4 pages.

Eykholt et al., "Robust Physical-World Attacks on Deep Learning Visual Classification", CVPR 2018, 11 pages.

Goodfellow et al., "Making Machine Learning Robust Against Adversarial Inputs", Communications of the ACM, Jul. 2018, vol. 61, No. 7, 13 pages.

He et al., "AppFA: A Novel Approach to Detect Malicious Android Applications on the Network", Security and Communication Networks, vol. 2018, Publication Date: Apr. 17, 2018, 12 pages.

International Search Report and Written Opinion for Application No. PCT/US2019/058697; International Filing Date: Oct. 30, 2019; dated Feb. 3, 2020; 12 pages.

Onwuzurike et al., "MaMaDroid: Detecting Android Malware by Building Markov Chains of Behavioral Models (Extended Vision)", Publication Date: Nov. 20, 2017, Retrieved from https://arxiv.org/pdf/1711.07477.pdf, 22 pages.

Peck, "Robustness of Classifiers to Adversarial Perturbations", Ghent University—Faculty of Sciences Department of Applied Mathematics, Computer Science and Statistics, May 2017, 97 pages.

Rajesh V. et al., "Droidswan: Detecting Malicious Android Application Based on Static Feature Analysis", Computer Science & Information Technology (CS & IT), 2015, Retrieved from DOI : 10.5121/csit.2015.51315, 16 pages.

Schmidt et al., "Monitoring Smartphones for Anomaly Detection", Mobile Networks and Applications, Publication Date: Nov. 13, 2008, vol. 14, Issue 1, 14 pages.

Serban et al., "Adversarial Examples—A Complete Charactersation of the Phenomenon", Feb. 2019, 56 pages.

Suarez-Tangil et al., "DroidSieve: Fast and Accurate Classification of Obfuscated Android Malware", Publication Date: Mar. 22-24, 2017, Retrieved http://dx.doi.org/10.1145/3029806.3029825, 12 pages.

Sun et al., "Contaminant Removal for Android Malware Detection Systems", Publication Date: Nov. 14, 2017, Retrieved from https://arxiv.org/pdf/1711.02715.pdf, 10 pages.

Wang et al., "Mlifdect: Android Malware Detection Based on Parallel Machine Learning and Information Fusion" Security and Communication Networks, vol. 2017, Publication Date: Aug. 28, 2017, 16 pages.

Yang et al., "AppContext: Differentiating Malicious and Benign Mobile App Behaviors Using Context", Publication Date: Apr. 15, 2015, Retrieved from http://weiyang3.web.engr.illinois.edu/ICSE15.pdf, 11 pages.

* cited by examiner

SYSTEM AND METHOD TO BUILD ROBUST CLASSIFIERS AGAINST EVASION ATTACKS

BACKGROUND

The invention generally relates to classifiers, and more particularly to building classifiers against evasion attacks.

Users are able to conveniently download software on their computing and mobile devices. Depending on the source of the software, users associate a general level of trust. The software may require the user to provide permission for certain functions of an application to operate. Users may not be aware of the permissions and access they are allowing applications to have. Various algorithms can be used to provide protection against harmful programs. However, attackers continue to provide programs to manipulate the user's devices or access the user's information. This type of program is known as malware. There may be a need to build more robust classifiers to detect harmful applications.

BRIEF DESCRIPTION

According to an embodiment, a system for building robust classifiers against evasion attacks is shown. The system includes a storage medium, the storage medium being coupled to a processor, where the processor is configured to receive an application; identify one or more features of the application; determine a first confidence score for a first version of the application including a first set of features and determining a second confidence score for a second version of the application including a second set of features, wherein the first set of features is different than the second set of features; determine a difference between the first confidence score and the second confidence score; compare the difference with a convergence threshold; based on the comparison, determine whether the first confidence score exceeds a confidence score threshold; and generate a report based on determining the first confidence score exceeds the confidence score threshold.

In addition to one or more of the features described herein, or as an alternative, further embodiments include a second set of features that include one less feature than the first set of features.

In addition to one or more of the features described herein, or as an alternative, further embodiments include identifying one or more features that ranks one or more features of the application.

In addition to one or more of the features described herein, or as an alternative, further embodiments include removing one or more features from a version of the application based at least in part on the ranking.

In addition to one or more of the features described herein, or as an alternative, further embodiments include determining the difference is less than the convergence threshold, the first confidence score is compared with the confidence score threshold; and generating the report based on the first confidence score exceeding the confidence score threshold.

In addition to one or more of the features described herein, or as an alternative, further embodiments include determining the difference is greater than the convergence threshold, the processor is configured to determine a third version of the application by removing one feature of the one or more features from the second version of the application; determine a third confidence score of the third version of the application; determine a difference between the second confidence score and the third confidence score; compare the difference with the convergence threshold; based on the comparison, determine whether the second confidence score exceeds the confidence score threshold; and generate the report based on determining the second confidence score exceeds the confidence score threshold.

In addition to one or more of the features described herein, or as an alternative, further embodiments include a processor that is further configured to determine a subsequent version by removing a feature of the identified features from a previous version, wherein the subsequent version includes a set of features with one less feature than a set of features for the previous version based at least in part on comparing a difference of a confidence score with a convergence threshold; determine a difference between a confidence score of the subsequent version and the previous version; and incrementally remove another feature until the difference between the confidence score of the subsequent version and the previous version until the difference exceeds the convergence threshold.

In addition to one or more of the features described herein, or as an alternative, further embodiments include a report that includes at least one of the one or more features, a type of malware, or permission information for the application.

In another embodiment, a method for building robust classifiers against evasion attacks is shown. The method includes receiving, by a processor, an application; identifying one or more features of the application; determining a first confidence score for a first version of the application including a first set of features and determining a second confidence score for a second version of the application including a second set of features, wherein the first set of features is different than the second set of features; determining a difference between the first confidence score and the second confidence score; comparing the difference with a convergence threshold; based on the comparison, determining whether the first confidence score exceeds a confidence score threshold; and generating a report based on determining the first confidence score exceeds the confidence score threshold.

In addition to one or more of the features described herein, or as an alternative, further embodiments include a second set of features that include one less feature than the first set of features.

In addition to one or more of the features described herein, or as an alternative, further embodiments include identifying the one or more features further includes ranking the one or more features of the application.

In addition to one or more of the features described herein, or as an alternative, further embodiments include removing the one or more features from the application based at least in part on the ranking.

In addition to one or more of the features described herein, or as an alternative, further embodiments include responsive to determining the difference is greater than the convergence threshold, the first confidence score is compared with the confidence score threshold; and generating the report based on the first confidence score exceeding the confidence score threshold.

In addition to one or more of the features described herein, or as an alternative, further embodiments include responsive to determining the difference is greater than the convergence threshold, determining a third version of the application by removing one feature of the one or more features from the second version of the application; determining a third confidence score of the third version of the application; determining a difference between the second confidence score and the third confidence score; comparing the difference with the convergence threshold; based on the comparison, determining whether the second confidence score exceeds the confidence score threshold; and generating the report based on determining the second confidence score exceeds the confidence score threshold.

In addition to one or more of the features described herein, or as an alternative, further embodiments include determining a subsequent version by removing a feature of the identified features from a previous version, wherein the subsequent version includes a set of features with one less feature than a set of features for the previous version based at least in part on comparing a difference of a confidence score with a convergence threshold; determining a difference between a confidence score of the subsequent version and the previous version; and incrementally removing another feature until the difference between the confidence score of the subsequent version and the previous version until the difference exceeds the convergence threshold.

In addition to one or more of the features described herein, or as an alternative, further embodiments include a report that includes at least one of the one or more features, a type of malware, or permission information for the application.

Technical effects of embodiments of the present disclosure include building a robust classifier against evasion attacks by identifying features of malicious/benign applications and the impact to the sensitivity of the classifier.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

The following descriptions should not be considered limiting in any way. With reference to the accompanying drawings, like elements are numbered alike.

DETAILED DESCRIPTION

Harmful programs and applications exist that can expose a user's personal information. For example, malware is a program that is executed in an attempt to gain access to unauthorized data or manipulate a program or device. In today's environment, many systems use various techniques to identify malware and prevent the installation of malicious programs on a user's device. One technique includes using classifiers to train machine-learning algorithms to predict whether an application is harmful or not. However, attackers have been creating subtle changes to the programs that may be undetected by the classifier of a security or program detection/defender functions. Machine-learning algorithms are trained on a set of features extracted from labeled samples or classes and the algorithm or mode is automatically learned to differentiate between the classes, hence called the classifier.

Issues may arise when the classifiers of the security programs learn from incorrectly classified application data, where the characteristics of the malicious programs are undetected and used to refine the classifier. Therefore, the reliability of the classifier is reduced with every misclassification of a program as malware. Attackers strategically add features to the application to attempt to confuse the machine-learning in to incorrectly classifying the malware as benign (not harmful). Because the techniques described herein analyze the impact of each feature on the sensitivity of the classifier, there is a less of a chance for misclassifying harmful applications as benign.

The techniques described herein determine feature sensitivity of an application based on an adversarial safe algorithm. The obtained sensitivity information is then used to predict whether an application is actually malicious or benign which improves the reliability of the classifier. The techniques described herein include sequencing/ranking the features of an application based on its importance; incrementally removing each feature to measure the sensitivity of the classifier; measuring the magnitude of the sensitivity and the feature removal is continued until a convergence of the magnitude of the sensitivity is observed; and using the sensitivity information to predict if the application is actually malicious or benign.

Figure 1:
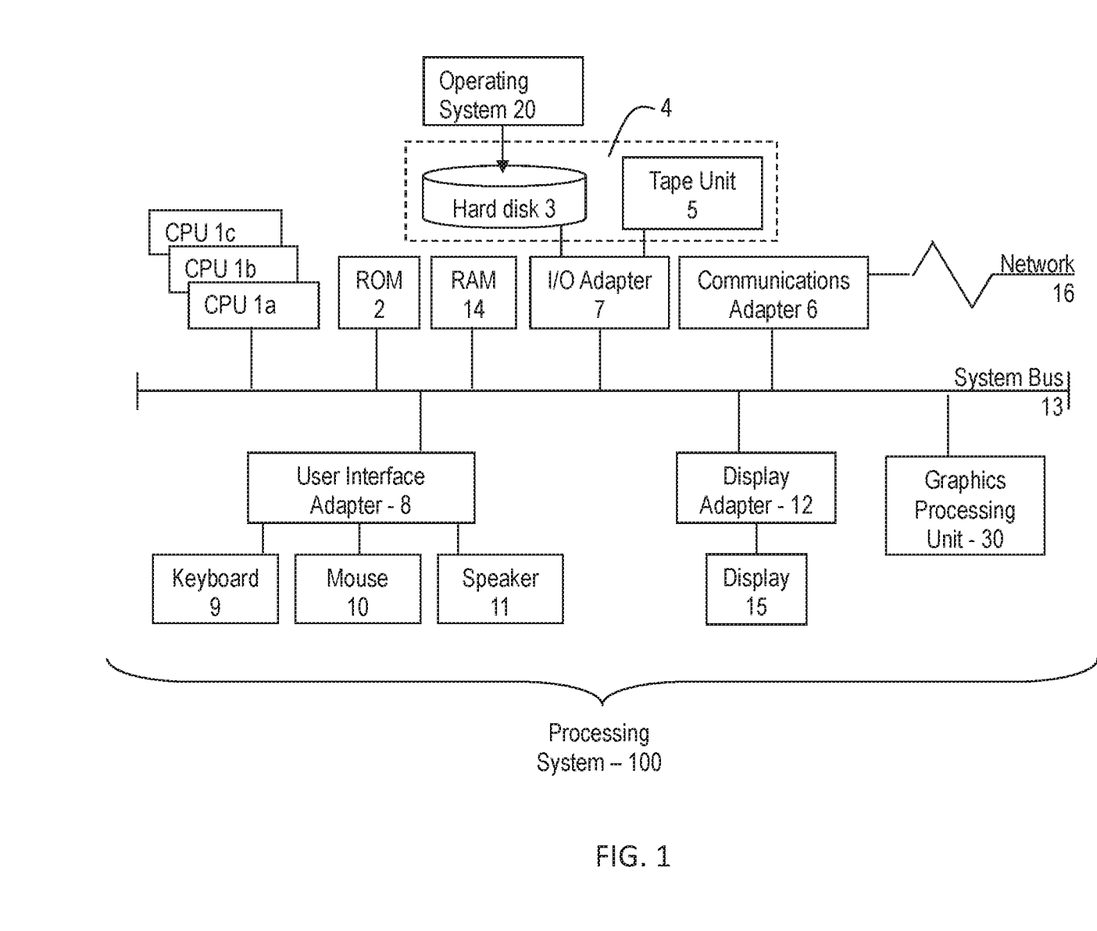
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 1a, 1b, 1c, etc. (collectively or generically referred to as processor(s) 1). In one embodiment, each processor 1 may include a reduced instruction set computer (RISC) microprocessor. Processors 1 are coupled to system memory 14 and various other components via a system bus 13. Read only memory (ROM) 2 is coupled to the system bus 13 and may include a basic input/output system (BIOS), which controls certain basic functions of system 100.

FIG. 1 further depicts an input/output (I/O) adapter 7 and a network adapter 6 coupled to the system bus 13. I/O adapter 7 may be a small computer system interface (SCSI) adapter that communicates with a hard disk 3 and/or tape storage drive 5 or any other similar component. I/O adapter 7, hard disk 3, and tape storage device 5 are collectively referred to herein as mass storage 4. Operating system 20 for execution on the processing system 100 may be stored in mass storage 4. A network adapter 6 interconnects bus 13 with an outside network 16 enabling data processing system 100 to communicate with other such systems. A screen (e.g., a display monitor) 15 is connected to system bus 13 by display adaptor 12, which may include a graphics adapter to improve the performance of graphics intensive applications and a video controller. In one embodiment, adapters 7, 6, and 12 may be connected to one or more I/O busses that are connected to system bus 13 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 13 via user interface adapter 108 and display adapter 12. A keyboard 9, mouse 10, and speaker 11 all interconnected to bus 13 via user interface adapter 8, which may include, for example, a Super I/O chip integrating multiple device adapters into a single integrated circuit.

In embodiments, the processing system 100 includes a graphics processing unit 30. Graphics processing unit 30 is a specialized electronic circuit designed to manipulate and alter memory to accelerate the creation of images in a frame buffer intended for output to a display. In general, graphics processing unit 30 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 1, storage capability including system memory 14 and mass storage 4, input means such as keyboard 9 and mouse 10, and output capability including speaker 11 and display 15. In one embodiment, a portion of system memory 14 and mass storage 4 collectively store an operating system to coordinate the functions of the various components shown in FIG. 1.

Figure 2:
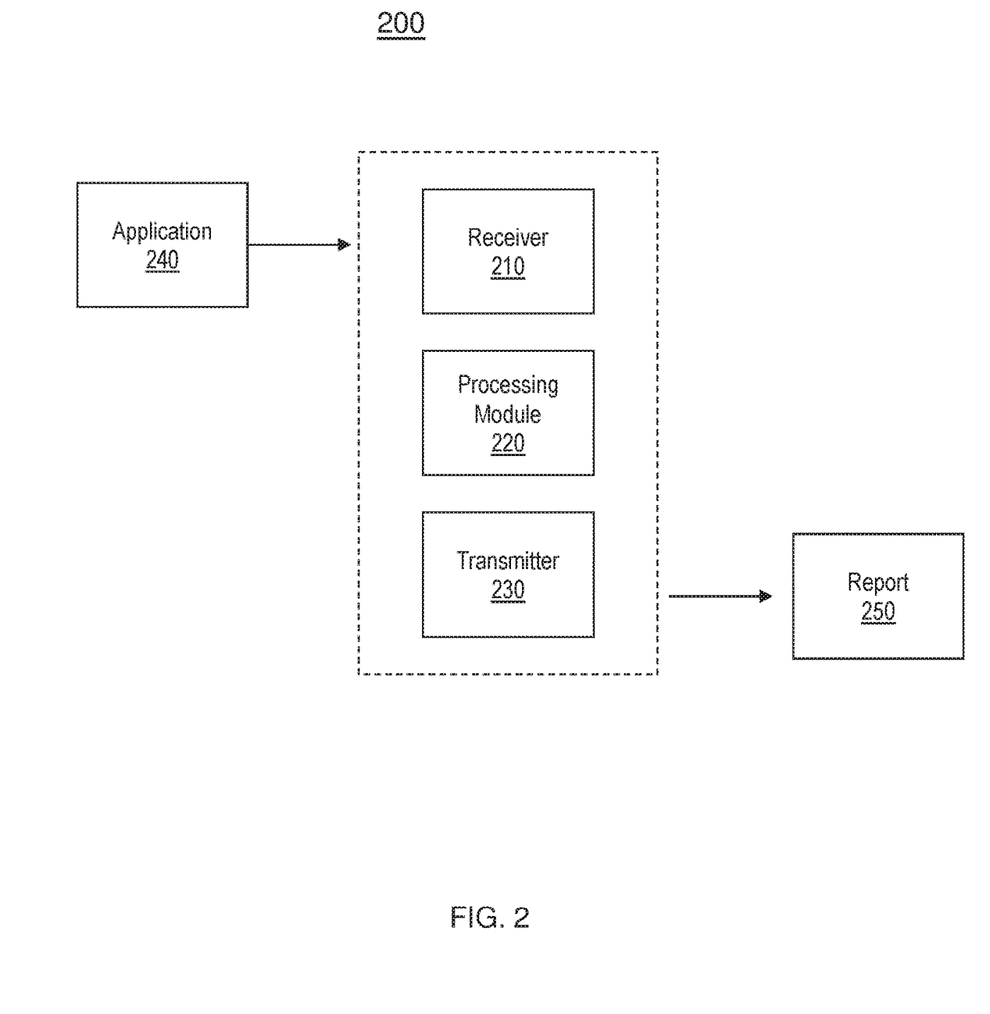
FIG. 2 depicts a system for building robust classifiers against evasion attacks in accordance with one or more embodiments.

Now turning to FIG. 2, a system 200 for building robust classifiers against evasion attacks in accordance with one or more embodiments is shown. The system can include one or more components shown in FIG. 1. The system 200 also includes a receiver 210, a processor 220, and a transmitter 230. It should be understood the system 200 can include other components include software, hardware, or a combination thereof to implement the techniques described herein.

The system 200 receives data at receiver 210 representing information such as an application 240, image, etc. In addition, the receiver 210 can receive data from one or more sources to be processed by the system 200. The received data is provided to the processing module 220. The processing module 220 is configured to identify the benign-only features of the received application.

In a non-limiting example, if the received application or data is an image of a dog and the attacker wants the machine-learning algorithm to identify the dog as a bird, the attacker can add features to the dog to confuse the machine-learning algorithm. This type of attack is known as an evasion attack. In one or more embodiments, other features can be collected by the machine-learning algorithm to identify patterns of Internet usage, support functionalities, file access, and others to make a prediction of whether the application is benign. It should be understood that other features can be used in the machine-learning algorithm to determine if the received application is malicious. The processing module 220 analyzes the image to determine the features of the image. For example, the benign features of a bird can include features such as the beak, wings, eyes, and feet/claws. The importance of each feature in identifying the bird as a bird can be ranked. In a non-limiting example, the bird's wings may be ranked first, then followed by the beak, feet/claws, and eyes. The ranking of the features can be determined using explainable artificial intelligence (XAI). The XAI analyzes the classifier to determine what features are used by the classifier to determine whether a feature is malicious or benign, or in the example, what features are used to determine an image of an animal is a dog or a bird.

The attacker may incrementally add features to the dog in an attempt to have the classifier determine the dog is a bird. Similarly, more benign features will be added to the malware or other types of malicious code in an attempt to have the classifier identify the code as benign and not harmful. For example, adding the wings and the beak to an image of a dog increases the chance of a classifier incorrectly identifying the dog as a bird. The techniques described herein can identify the features and reduce the chances for misclassification.

The processing module 220 includes a first version of the application and a second version of the application. The confidence score $C_i$ is determined for the first version of the application containing the set of features, and the confidence score $C_{i-1}$ is determined for a second version of the application containing the set of features minus the $i^{th}$ feature. By removing the $i^{th}$ feature, the magnitude of the sensitivity of the $i^{th}$ feature on the classifier can be determined.

A delta between the confidence scores $C_i$ and $C_{i-1}$ is determined and in the event the delta is greater than a convergence threshold, the algorithm continues to remove the next feature from the previous version of the application, calculates the confidence score between the previous version and the subsequent version, determines a delta between the previous version and the subsequent version to compare to the convergence threshold. The method continues to remove the next highest ranked feature from the previous version to form a subsequent version until the delta between the confidence score between the previous version and subsequent version is below the convergence threshold. When the delta is below the convergence threshold, this indicates the $i^{th}$ feature has minimal impact on the algorithm and therefore the application is not determined as not being malicious.

The process repeats the cycle until the convergence threshold is greater than the delta between the $i^{th}$ confidence score and the $i^{th-1}$ confidence score. In one or more embodiments, the convergence threshold can be configured according to a default value or configured by an operator.

After the program has converged (the delta is below the convergence threshold), the confidence score $C^i$ of the latest version of the application is determined. In the event the confidence score for the algorithm exceeds a confidence score threshold, such as a confidence score threshold of 95, the application is reported as malicious. In one or more embodiments, the processing module 220 generates a report 250, and the transmitter 230 is configured to send the report and/or notification to one or more destinations. The notification can include an alert. In one or more embodiments, the notification can include the features that were analyzed and determined to be malicious. In other embodiments, the notifications can include the type of malicious software such as ransomware, Trojan, or another type of virus etc. In addition, the level of permissioning can be included in the notification. For example, the permissioning can indicate levels including a suspicious level, over-privileged level, etc. It should be understood that the other levels can be used and provided in the report 250. If the confidence score $C^i$ does not exceed the confidence score threshold, it is not necessary for the report 250 to be generated, but in an alternative embodiment, the report 250 can be generated and provided to the user.

Figure 3:
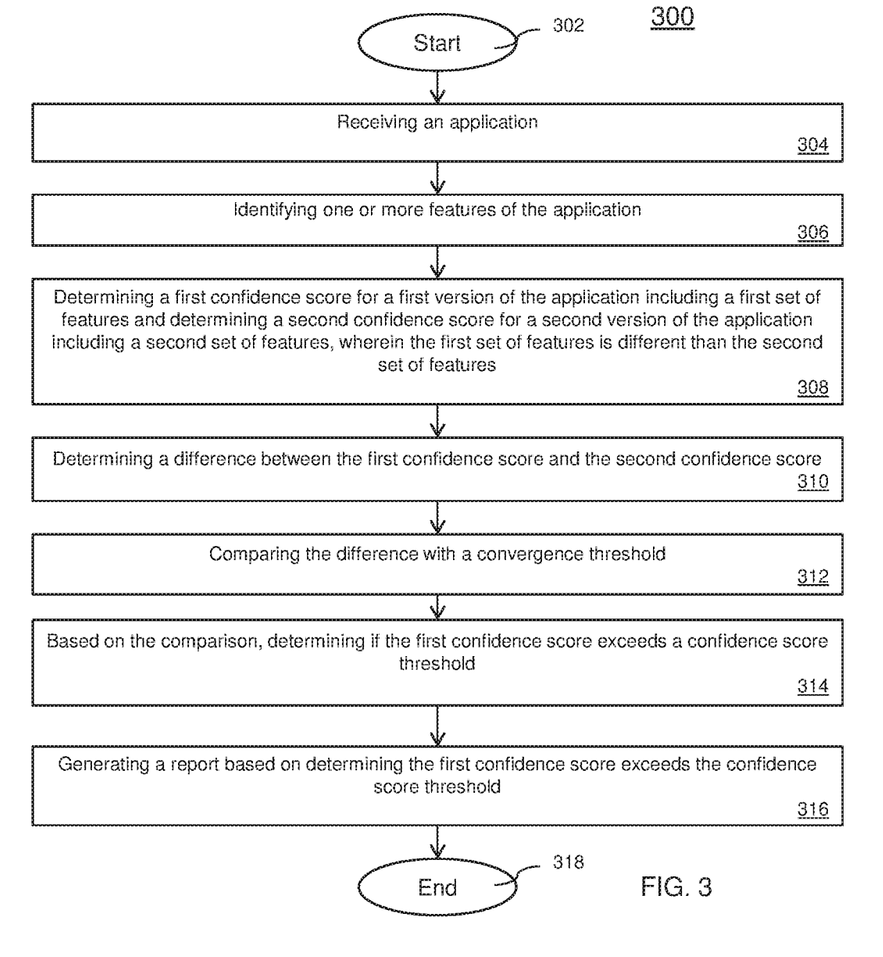
FIG. 3 depicts a flowchart of a method for building robust classifiers against evasion attacks in accordance with one or more embodiments.

In FIG. 3, a flowchart of a method 300 for building robust classifiers against evasion attacks in accordance with one or more embodiments is provided. The method 300 begins at block 302 and proceeds to block 304 which provides for receiving an application. At block 306, the method 300 provides for identifying one or more features of the application. The identified features of the application are ranked in an order of least benign to most benign. The ranking can be determined by explainable AI which provides details on what caused the machine-learning algorithm to make certain decisions.

At block 308, the method 300 provides for determining a first confidence score for a first version of the application including a first set of features and determining a second confidence score for a second version of the application including a second set of features, wherein the first set of features is different than the second set of features. The second version of the application is determined by removing the highest ranking feature from the set of features for the application.

At block 310, the method 300 provides for determining a difference between the first confidence score and the second confidence score. The confidence score can be determined by known techniques. At block 312, the method 300 provides for comparing the difference with a convergence threshold. In the event the difference between the first and second confidence score is greater than the convergence threshold, another feature is removed from the second version of the application to form a third version or subsequent version of the application. After the feature is removed from the previous version, a confidence score of the previous version and the subsequent version is determined. Next, the difference between the confidence score of the previous version and the subsequent version is compared to the convergence threshold. If the difference is greater than the convergence threshold, the next feature is removed from the latest version of the application and the process is repeated until the last feature is removed from the application or until the difference between the confidence scores does not exceed the convergence threshold.

Otherwise, in the event the difference between the first and second confidence scores is less than the convergence threshold, the confidence score of the first version is returned. At block 314, the method 300 provides for based on the comparison, determining if the first confidence score exceeds a confidence score threshold. At block 316, the method 300 provides for generating a report based on determining the first confidence score exceeds the confidence score threshold. The confidence score is compared to the confidence score threshold and a report is generated if the confidence score threshold is exceeded. The report can include various types of information including the features and permissions that are used by the application, the report can further classify the type of malware such as ransomware, Trojan, etc. The method 300 ends at block 318.

Figure 4:
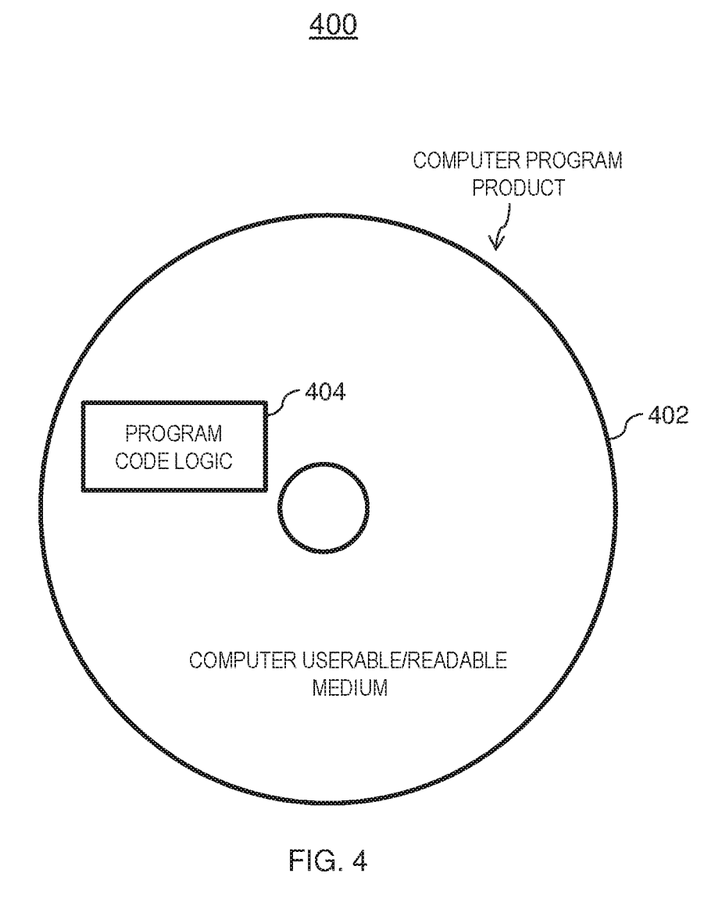
FIG. 4 depicts a computer-program product in accordance with one or more embodiments.

Referring now to FIG. 4, a computer program product 400 in accordance with an embodiment that includes a computer readable storage medium 402 and program instructions 404 is generally shown.

The techniques described herein improve the classifiers of machine-learning algorithms by ensuring they are safe from perturbations and exposing the malicious nature of the applications. The techniques described herein also provide for understanding the importance of each feature (benign and malicious) of the application used for decision making and how each benign feature perturbation can affect the decision boundary. Finally, the techniques described herein improve the overall reliability of the classifier of the machine-learning algorithm.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for building a robust classifier against evasion attacks, the system comprising:
    a storage medium, the storage medium being coupled to a processor;
    the processor configured to:
    receive an application;
    identify one or more features of the application;
        determine a first confidence score for a first version of the application including a first set of features and determining a second confidence score for a second version of the application including a second set of features, wherein the first set of features is different than the second set of features;
        determine a difference between the first confidence score and the second confidence score;
        compare the difference with a convergence threshold;
        based on the comparison, determine whether the first confidence score exceeds a confidence score threshold; and
        generate a report based on determining the first confidence score exceeds the confidence score threshold;
    wherein in response to determining the difference is greater than the convergence threshold, the processor is configured to:
    determine a third version of the application by removing one feature of the one or more features from the second version of the application;
    determine a third confidence score of the third version of the application;
    determine a difference between the second confidence score and the third confidence score;
    compare the difference with the convergence threshold;
    based on the comparison, determine whether the second confidence score exceeds the confidence score threshold; and
    generate the report based on determining the second confidence score exceeds the confidence score threshold.

2. The system of claim 1, wherein the second set of features includes one less feature than the first set of features.

3. The system of claim 2, wherein the identification of the one or more features comprises ranking the one or more features of the application.

4. The system of claim 3, wherein the processor is further configured to remove the one or more features from a version of the application based at least in part on the ranking.

5. The system of claim 1, wherein determining the difference is less than the convergence threshold, the first confidence score is compared with the confidence score threshold; and
 generate the report based on the first confidence score exceeding the confidence score threshold.

6. The system of claim 1, based at least in part on comparing a difference of a confidence score with a convergence threshold, the processor is further configured to determine a subsequent version by removing a feature of the identified features from a previous version, wherein the subsequent version includes a set of features with one less feature than a set of features for the previous version;
 determine a difference between a confidence score of the subsequent version and the previous version; and
 incrementally remove another feature until the difference between the confidence score of the subsequent version and the previous version until the difference exceeds the convergence threshold.

7. The system of claim 1, wherein the report comprises at least one of the one or more features, a type of malware, or permission information for the application.

8. A method for building a robust classifier against evasion attacks, the method comprising:
 receiving, by a processor, an application;
 identifying one or more features of the application;
 determining a first confidence score for a first version of the application including a first set of features and determining a second confidence score for a second version of the application including a second set of features, wherein the first set of features is different than the second set of features;
 determining a difference between the first confidence score and the second confidence score;
 comparing the difference with a convergence threshold;
 based on the comparison, determining whether the first confidence score exceeds a confidence score threshold; and
 generating a report based on determining the first confidence score exceeds the confidence score threshold;
 wherein in response to the difference being greater than the convergence threshold, determining a third version of the application by removing one feature of the one or more features from the second version of the application;
 determining a third confidence score of the third version of the application;
 determining a difference between the second confidence score and the third confidence score;
 comparing the difference with the convergence threshold;
 based on the comparison, determining whether the second confidence score exceeds the confidence score threshold; and
 generating the report based on determining the second confidence score exceeds the confidence score threshold.

9. The method of claim 8, wherein the second set of features includes one less feature than the first set of features.

10. The method of claim 9, wherein identifying the one or more features further comprises ranking the one or more features of the application.

11. The method of claim 10, further comprises removing the one or more features from the application based at least in part on the ranking.

12. The method of claim 8, based at least in part on comparing a difference of a confidence score with a convergence threshold, determining a subsequent version by removing a feature of the identified features from a previous version, wherein the subsequent version includes a set of features with one less feature than a set of features for the previous version;
 determining a difference between a confidence score of the subsequent version and the previous version; and
 incrementally removing another feature until the difference between the confidence score of the subsequent version and the previous version until the difference exceeds the convergence threshold.

13. The method of claim 8, wherein the report comprises at least one of the one or more features, a type of malware, or permission information for the application.

* * * * *